US007734362B2

(12) United States Patent
Roeder et al.

(10) Patent No.: US 7,734,362 B2
(45) Date of Patent: Jun. 8, 2010

(54) CALCULATING A DOPPLER COMPENSATION VALUE FOR A LOUDSPEAKER SIGNAL IN A WAVEFIELD SYNTHESIS SYSTEM

(75) Inventors: Thomas Roeder, Elxleben (DE); Thomas Sporer, Fuerth (DE); Sandra Brix, Ilmenau (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 1261 days.

(21) Appl. No.: 11/257,781

(22) Filed: Oct. 25, 2005

(65) Prior Publication Data

US 2006/0092854 A1 May 4, 2006

Related U.S. Application Data

(63) Continuation of application No. PCT/EP2004/005047, filed on May 11, 2004.

(30) Foreign Application Priority Data

May 15, 2003 (DE) ................................ 103 21 980

(51) Int. Cl.
*G06F 17/00* (2006.01)
*H04R 5/00* (2006.01)
*H04B 1/00* (2006.01)

(52) U.S. Cl. ............................ 700/94; 381/17; 381/119

(58) Field of Classification Search ............. 381/17–18, 381/119; 369/4–5, 86–87, 91–92
See application file for complete search history.

(56) References Cited

U.S. PATENT DOCUMENTS 5,052,685 A * 10/1991 Lowe et al. ................... 381/17
5,495,576 A * 2/1996 Ritchey ...................... 345/420

(Continued)

FOREIGN PATENT DOCUMENTS

JP 04-132499 6/1992

(Continued)

OTHER PUBLICATIONS

Verheijen, Edwin Nico Gerard, "Sound Reproduction by Wave Field Synthesis", Jan. 1998, pp. 45-47, 83-85, 104-112.*

(Continued)

*Primary Examiner*—Curtis Kuntz
*Assistant Examiner*—Jesse A Elbin
(74) *Attorney, Agent, or Firm*—Keating & Bennett, LLP

(57) ABSTRACT

For reducing Doppler artifacts in the wave-field synthesis due to delay changes from one time to a second time, first, the delay for the first time and the delay for the second time are determined. Then, a value of an audio signal delayed by the first delay for the current time and the value for the audio signal delayed by the second delay for the current time are determined. Then, the first value is weighted by a first weighting factor and a second value is averaged with a second weighting factor, whereupon the two weighted values are added up to obtain a discrete value for the current time of the component in a loudspeaker signal for a loudspeaker based on a virtual source. Thus, by knowing a delay present at a later time, panning is obtained from a delay to a subsequent delay, which reduces undesired Doppler artifacts.

22 Claims, 8 Drawing Sheets

U.S. PATENT DOCUMENTS

| | | | | |
|---|---|---|---|---|
| 5,598,478 A * | 1/1997 | Tanaka et al. | ................. | 381/17 |
| 5,715,318 A * | 2/1998 | Hill et al. | ....................... | 381/17 |
| 5,862,229 A * | 1/1999 | Shimizu | ...................... | 381/17 |

FOREIGN PATENT DOCUMENTS

| | | |
|---|---|---|
| JP | 06-233869 | 8/1994 |
| JP | 06-245300 | 9/1994 |
| WO | WO 01/23104 A2 | 4/2001 |

OTHER PUBLICATIONS

De Bruijn, Werner P.J. et al; "Subjective experiments on the effects of combining spatialized audio and 2D video projection in audio-visual systems"; Audio Engineering Society Convention Paper 5582; 2002; pp. 1-11; Munich, Germany.

Reiter, Ulrich et al.; "Automatisierte Anpassung der Akustik an virtuelle Räume"; 46$^{th}$ International Scientific Colloquium; Ilmenau Technical University; Sep. 24, 2001; Ilmenau, Germany.

Berkhout, A.J. et al.; "Acoustic control by wave field synthesis"; The Journal of the Acoustical Society of America; May 1993; No. 5; pp. 2764-2778; New York, USA.

Spors, S. et al.; "High-Quality Acoustic Rendering with Wave Field Synthesis"; Vision, Modeling, and Visualization 2002, 'Online!; Nov. 22, 2002; pp. 101-108; Erlangen, Germany.

Spors, S. et al.; "Listening Room Compensation For Wave Field Synthesis"; IEEE Proceedings of International Conference on Multimedia and Expo; Jul. 9, 2003; pp. 725-728; vol. 1.

Horbach, U. et al.; "Real-Time Rendering Of Dynamic Scenes Using Wave Field Synthesis"; IEEE Proceedings of International Conference on Multimedia and Expo; 2002; pp. 517-520.

Pellegrini, R. et al.; "Perceptual Encoding of Acoustic Environments"; IEEE Proceedings of International Conference on Multimedia and Expo; 2002; pp. 501-503.

* cited by examiner component $k_{ij}$: component in loudspeaker signal for the loudspeaker j due to the virtual source example: position update interval PAI = $NT_a$

N = 3

Kij = m A1 + n A4 ;

$0 \leq t' \leq 2$ : m=1 ; n=0
$3 \leq t' \leq 5$ : m=0,66 ; n=0,33
$6 \leq t' \leq 8$ : m=0,33 ; n=0,66
$9 \leq t' \leq 11$ : m=0 ; n=1

CALCULATING A DOPPLER COMPENSATION VALUE FOR A LOUDSPEAKER SIGNAL IN A WAVEFIELD SYNTHESIS SYSTEM

CROSS-REFERENCE TO RELATED APPLICATION

This application is a continuation of copending International Application No. PCT/EP2004/005047, filed May 11, 2004, which designated the United States and was not published in English, which claimed priority to German Patent Application No. 103 21 980.3, filed on May 15, 2003, and which is incorporated herein by reference in its entirety.

BACKGROUND OF THE INVENTION

1. Field of the Invention

The present invention relates to wave-field synthesis systems and particularly to wave-field synthesis systems allowing moving virtual sources.

2. Description of the Related Art

There is an increasing demand for new technologies and innovative products in the field of consumer electronics. Here, it is an important prerequisite for the success of new multimedia systems to offer optimum functionalities or capabilities, respectively. This is achieved by the usage of digital technologies and particularly computer technology. Examples therefore are applications offering an improved realistic audiovisual impression. In prior art audio systems, a significant weak point is the quality of the spatial sound reproduction of real but also virtual environments.

Methods for multichannel loudspeaker reproduction of audio signals have been known and standardized for many years. All common techniques have the disadvantage that both the location of the loudspeakers and the position of the listener are already imprinted in the transmission format. If the loudspeakers are positioned in a wrong way with regard to the listener, the audio quality suffers significantly. An optimum sound is only possible in a very small area of the reproduction room, the so called sweet spot.

An improved natural spatial impression as well as stronger enclosure during audio reproduction can be obtained with the help of new technology. The basics of this technology, the so called wave-field synthesis (WFS) have been researched at the TU Delft and have been presented for the first time in the late 80ies (Berkhout, A. J.; de Vries, D.; Vogel, P.: Acoustic control by Wave-field Synthesis. JASA 93, 1993).

Due to the huge requirements of this method with regard to computing effort and transmission rates, the wave-field synthesis has so far only rarely been applied in practice. Only the progresses in the field of microprocessor technique and audio encoding allow the usage of this technology in specific applications today. First products in the professional field are expected next year. In a few years, the first wave-field synthesis applications for the consumer field will come on the market.

The basic idea of WFS is based on the application of the Huygens principle of the wave theory.

Every point captured by a wave is the starting point of an elementary wave, which propagates in a spherical or circular way.

Applied to acoustics, any form of an incoming wave front can be reproduced by a large number of loudspeakers arranged next to another (a so called loudspeaker array). In the simplest case, a single point source to be reproduced and a linear arrangement of the loudspeakers, the audio signals of every loudspeaker have to be fed with a time delay and amplitude scaling such that the emitted sound fields of the individual loudspeakers overlay properly. With several sound sources, the contribution to every loudspeaker is calculated separately for every source and the resulting signals are added. In a virtual space with reflecting walls, the reflections can also be reproduced via the loudspeaker array as additional sources. Thus, the calculation effort depends heavily on the number of sound sources, the reflection characteristics of the recording room and the number of loudspeakers.

The particular advantage of this technique is that a natural spatial sound impression is possible across a large area of the reproduction room. In contrary to the known techniques, direction and distance from the sound sources are reproduced very accurately. To a limited degree, virtual sound sources can even be positioned between the real loudspeaker array and the listener.

Although wave-field synthesis functions well for surroundings whose conditions are known, irregularities occur when the conditions change or when wave-field synthesis is performed based on surrounding conditions which do not correspond to the actual condition of the surroundings, respectively.

The technique of wave-field synthesis can also be used advantageously to add a corresponding spatial audio perception to a visual perception. So far, during production in virtual studios, the focus was on the production of an authentic visual impression of the virtual scene. The acoustic impression matching the image is normally imprinted on the audio signal afterwards by manual operating steps in the so-called post-production or is considered to be too expensive and too time-consuming to realize and is thus neglected. This causes normally a discrepancy between individual sense impressions, which causes the designed space, i.e. the designed scene, to be considered as less authentic.

In the expert publication "Subjective experiments on the effects of combining spatialized audio and 2D video projection in audio-visual systems", W. de Bruijn and M. Boone, AES convention paper 5582, May $10^{th}$ to $13^{th}$, 2003, Munich, subjective experiments with regard to the effects of combining spatial audio and a two-dimensional video projection in audiovisual systems are presented. Particularly, it is emphasized that two speakers standing at different distances to a camera, who stand almost behind one another, can be understood better by an audience when the two persons standing behind one another can be seen and reconstructed as different virtual sound sources with the help of wave-field synthesis. In that case, it has been found out by subjective tests that a listener can better understand and differentiate the two speakers speaking simultaneously when they are separated.

In a conference contribution for the $46^{th}$ international academic colloquium in Ilmenau from Sep. 24 to 27, 2001, with the title "Automatisierte Anpassung der Akustik an virtuelle Räume", U. Reiter, F. Melchior and C. Seidel, an approach for automating sound post-processing processes is presented. Therefore, the parameters of a film set required for the visualization, such as room size, texture of the surfaces or camera position and position of the actors are checked for their acoustic relevance, whereupon corresponding control data are generated. These influence then in an automated way the effect and post-processing processes used for postproduction, such as the adaptation of the speaker volume dependency on the distance to the camera or the reverberation time in dependence on room size and wall conditions. Here, it is the aim to enforce the visual impression of a virtual scene for an increased perception of reality.

It is intended to enable "listening with the ears of the camera" for making a scene appear more real. In this connection, it is intended that a correlation between sound event location in the image and listening event location in the surround field is as high as possible. This means that sound source positions are constantly adapted to an image. Camera parameters, such as zoom, are also to be incorporated in the sound design like a position of two loudspeakers L and R. Therefore, tracking data of a virtual studio are written into a file by the system together with an associated time code. Image, sound and time code are recorded simultaneously on an VTR. The Camdump file is transmitted to a computer, which generates control data for an audio workstation therefrom and outputs them via an MIDI interface synchronously to the image coming from the VTR. The actual audio processing as well as positioning the sound source in the surround field and inserting earlier reflections and reverberation is performed within the audio workstation. The signal is rendered for a 5.1 surround loudspeaker system.

Camera tracking parameters as well as positions of sound sources in the recording setting can be recorded in real film sets. Such data can also be generated in virtual studios.

In a virtual studio, an actor or presenter is alone in a recording room. Particularly, he stands in front of a blue wall, which is also referred to as blue box or blue panel. On this blue wall, a pattern of blue and light-blue stripes is disposed. Special about this design is that the stripes have a different width and thus a plurality of stripe combinations result. During post-processing, when the blue wall is replaced by a virtual background, it is possible to determine exactly which direction the camera looks due to the unique stripe combination on the blue wall. With the help of this information, the computer can determine the background for the current angle of view of the camera. Further, sensors at the camera are evaluated, which detect additional camera parameters and output the same. Typical parameters of a camera, which are detected via sensor technology, are the three translation degrees x, y, z, the three rotation degrees, which are also referred to as roll, tilt, pan, and the focal length or the zoom, respectively, which is equal to the information about the aperture angle of the camera.

In order to be able to determine the exact position of the camera even without image recognition and without expensive sensor technique, the tracking system can also be used, which consists of several infrared cameras, which determine the position of an infrared sensor mounted to the camera. Thereby, the position of the camera is also determined. With the camera parameters provided by the sensor technology and the stripe information evaluated by image recognition, a real time computer can now calculate the background for the current image. Then, the blue hue, which the blue background had, is removed from the image, so that instead of the blue background the virtual background is brought in.

In most cases, a concept is followed, which is based on getting an acoustic overall impression of the visually imaged scene. This can be described with the expression "full shot" coming from image design. This "full shot" sound impression remains mostly constant via all settings in a scene, although the optical angle of view on things often changes very much. Optical details are emphasized by corresponding angles or moved into the background. Countershots in creating dialogs in films are also not reproduced by sounds.

Thus, there is the need to embed the audience acoustically into an audiovisual scene. In this connection, the screen or the image area is the line of vision and the angle of view of the audience. This means that the sound is to follow the image in the form that it always corresponds to the image. This is particularly important for virtual studios since there is typically no correlation between the sound of the moderation, for example and the surroundings where the presenter is at the moment. In order to get an audiovisual overall impression of the scene, a room impression matching the rendered image has to be simulated. In that context, the location of a sound source, as it is perceived by, for example, an audience of a cinema screen, is a significant subjective characteristic in such a sound concept.

In the audio domain, a good spatial sound can be obtained for a large listener area by the technique of wave-field synthesis (WFS). As it has been discussed, the wave-field synthesis is based on the principle of Huygens, according to which wave fronts can be formed and structured by overlaying elementary waves. According to mathematically correct theoretical description, an infinite amount of sources in infinitely small distance would have to be used for generating the elementary waves. Practically, however, a finite amount of loudspeakers are used in a finite small distance to each other. According to the WFS principle, each of these loudspeakers is controlled by an audio signal from a virtual source, which has a certain delay and a certain level. Levels and delays are normally different for all loudspeakers.

In the audio domain exists a so called natural Doppler effect. This Doppler effect occurs from a source sending an audio signal with a certain frequency, a receiver receiving the signal and a movement of the source taking place relative to the receiver. Due to an "extension" or "compression" of the acoustic waveforms, this causes the frequency of the audio signal to change for the receiver according to the movement. Normally, a person is the receiver and hears this frequency change directly, for example when an ambulance with siren moves towards a person and then passes the person. The person will hear the siren at the time when the ambulance is in front of him with a different pitch than when the ambulance is behind him.

A Doppler effect exists also in the wave-field synthesis or sound field synthesis, respectively. It is physically based on the same background as the above-described natural Doppler effect. However, in contrary to the natural Doppler effect, there is no direct path between sender and receiver in sound field synthesis. Instead, a differentiation is made in that there is a primary transmitter and a primary receiver. Above that, a secondary transmitter and a secondary receiver exist. This scenario will be discussed below with reference to FIG. 7.

FIG. 7 shows a virtual source 700, which moves from a first position, which is indicated by an encircled "1" in FIG. 7 over time along a path of movement 702 to a second position, which is indicated in FIG. 7 by an encircled "2". Further, three loudspeakers 704 are shown schematically, which are to symbolize a wave-field synthesis loudspeaker array. Further, there is a listener 706 in the scenario, which is arranged in the example shown in FIG. 7 such that the path of movement of the virtual source is a circular path, which extends around the listener, who is the center of this circular path. The loudspeakers 704, however, are not disposed in the center, in that at the time when the virtual source 700 is at the first position, the same has a first distance $r_1$ from a loudspeaker and that the source then has a second distance $r_2$ to the source in its second position. In the scenario shown in FIG. 7, $r_1$ is unequal $r_2$, while $R_1$, which means the distance of the virtual source from the listener 706 is equal to the distance of the listener 706 from the virtual source at a time 2. This means that no distance change of the virtual source 700 takes place for the listener 706. On the other hand, there is a distance change of the virtual source 700 relative to the loudspeakers 704, since $r_1$ is unequal to $r_2$. The virtual source represents the primary transmitter, while the loudspeakers 704 represent the primary receiver. Simultaneously, the loudspeakers 704 represent the secondary transmitter, while the listener 706 represented the secondary receiver.

In wave-field synthesis, the transmission between primary transmitter and primary receiver takes place "virtually". This means that the wave-field synthesis algorithms are responsible for extension and compression of the wave front of the waveforms. At the time when a loudspeaker 704 receives a signal from the wave-field synthesis module, there is no audible signal at first. The signal only becomes audible after being output by the loudspeaker. Thereby, Doppler effects can occur at different locations.

If the virtual source moves relative to the loudspeakers, every loudspeaker reproduces a signal with different Doppler effect, depending on its specific position with regard to the moving virtual source, since the loudspeakers are in different positions and thus the relative movements are different for every loudspeaker.

On the other hand, the listener can also move relative to the loudspeakers. However, particularly in a cinema setting, this is an insignificant case in practice, since the movement of the listener with regard to the loudspeakers will always be a relatively slow movement with a relatively small Doppler effect, since the Doppler shift, as it is known in the art, is proportional to the relative motion between transmitter and receiver.

The former Doppler effect, which means when the virtual source moves relative to the loudspeakers, can sound relatively natural but also very unnatural. This depends on the direction of the movement. If the source moves away from the center of the system or towards the same in a straight manner, a rather natural effect results. With reference to FIG. 7, this would mean that the virtual source 700 moves, for example, along the arrow $R_1$ away from the listener.

However, if the virtual source 700 "encircles" the listener, as it is illustrated with regard to FIG. 7, a very unnatural effect results, since the relative motion between primary source and primary receiver (loudspeaker) are very strong and also very different within the different primary receivers, which is in sharp contrast to nature, wherein the case of encircling the source to listener no Doppler effects results, since no distance change occurs between source and listener.

SUMMARY OF THE INVENTION

It is an object of the present invention to provide an improved concept for calculating a discrete value at a current time of a component in a loudspeaker signal where artifacts due to Doppler effects are reduced.

In accordance with a first aspect, the present invention provides an apparatus for calculating a discrete value for a current time of a component in a loudspeaker signal for a loudspeaker based on a virtual source in a wave-field synthesis system with a wave-field synthesis module and a plurality of loudspeakers, wherein the wave-field synthesis module is formed to determine delay information by using an audio signal associated to the virtual source and by using position information indicating a position of the virtual source, indicating delayed by how many samples the audio signal is to occur with regard to a time reference in the component, having: a means for providing a first delay associated to a first position of the virtual source at a first time, and for providing a second delay associated to a second position of the virtual source at a second later time, wherein the second position differs from the first position and wherein the current time lies between the first time and the second time; a means for determining a value of the audio signal delayed by the first delay for the current time and for determining a second value of the audio signal delayed by the second delay for the current time; a means for weighting the first value with a first weighting factor to obtain a first weighted value, and a second value with a second weighting factor to obtain a second weighted value; and a means for summing the first weighted value and the second weighted value to obtain the discrete value for the current time.

In accordance with a second aspect, the present invention provides a method for calculating a discrete value for a current time of a component in a loudspeaker signal for a loudspeaker based on a virtual source in a wave-field synthesis system with a wave-field synthesis module and a plurality of loudspeakers, wherein the wave-field synthesis module is formed to determine delay information by using an audio signal associated to the virtual source and by using position information indicating a position of the virtual source, indicating delayed by how many samples the audio signal is to occur with regard to a time reference in the component, having the steps of: providing a first delay associated to a first position of the virtual source to a first time, and providing a second delay associated to a second position of the virtual source at a second later time, wherein the second position differs from the first position and wherein the current time lies between the first time and the second time; determining a value of the audio signal delayed by the first delay for the current time and determining a second value of the audio signal delayed by the second delay for the current time; weighting the first value with the first weighting factor to obtain a first weighted value, and a second value with a second weighting factor to obtain a second weighted value; and summing the first weighted value and the second weighted value to obtain the discrete value for the current time.

In accordance with a third aspect, the present invention provides a computer program with a program code for performing the method for calculating a discrete value for a current time of a component in a loudspeaker signal for a loudspeaker based on a virtual source in a wave-field synthesis system with a wave-field synthesis module and a plurality of loudspeakers, wherein the wave-field synthesis module is formed to determine delay information by using an audio signal associated to the virtual source and by using position information indicating a position of the virtual source, indicating delayed by how many samples the audio signal is to occur with regard to a time reference in the component, having the steps of: providing a first delay associated to a first position of the virtual source to a first time, and providing a second delay associated to a second position of the virtual source at a second later time, wherein the second position differs from the first position and wherein the current time lies between the first time and the second time; determining a value of the audio signal delayed by the first delay for the current time and determining a second value of the audio signal delayed by the second delay for the current time; weighting the first value with the first weighting factor to obtain a first weighted value, and a second value with a second weighting factor to obtain a second weighted value; and summing the first weighted value and the second weighted value to obtain the discrete value for the current time, when the program runs on a computer.

The present invention is based on the knowledge that Doppler effects can be considered, since they are part of the information required for position identification of a source. If such Doppler effects had to be omitted fully, this could lead to the fact that no optimum sound experience results, since the Doppler effect is natural and it would result in a non-optimum impression, if, for example, a virtual source moves towards a listener but no Doppler shift of the audio frequency takes place.

On the other hand, according to the invention, for "slurring" the Doppler effect, to the effect that it is present but its effect do lead to no or only reduced artifacts, "banning" is performed from one position to another position. Then, in the prior art, when a delay change occurs, which means when a change of position of the virtual source occurs, samples are simply inserted artificially during a reduced delay or samples are simply omitted during an increased delay. This causes sharp jumps in the signal. However, according to the invention these sharp jumps are reduced by achieving a continuous transition from one position of the virtual source to another position of the virtual source. Therefore, in a panning region, a discrete value is calculated for a current time in the panning region by using a sample of the audio signal at the first position valid for the current time, which means at a first time, and by using a sample of an audio signal of the virtual position at the second position associated to a current time, which means the second time.

Preferably, panning occurs to the effect that at the first time when the first position changes and thus the first delay information is valid, a weighting factor for the audio signal delayed by the first delay is 100%, while a weighting factor for the audio signal delayed by the second delay is 0%, and that then an opposing change of the two weighting factors is performed from the first time to the second time in order to "pan" "smoothly" from the one position to the other position.

The inventive concept represents a tradeoff between a certain loss of position information on the one hand since new position information of the source are no longer considered with every new current time, since a position update of the virtual source is performed in rather coarse steps, wherein panning is performed between the one position of the source and the second position of the source occurring at a later time. This is performed by performing the delay first for relatively coarse spatial step widths, i.e. position information relatively distant in time (of course by considering the speed of the source). Thereby, the delay change leading to the above-mentioned virtual Doppler effect between the primary transmitter and the primary receiver, is slurred, i.e. transformed continuously from one delay change to the other. According to the invention, "panning" is performed via volume scaling from one position to the next to avoid spatial jumps and thereby audible "clicks". Thereby, "hard" omitting or adding of samples due to delay change is replaced by a signal shape adapted to the hard signal shape with rounded edges, so that the delay changes are accounted for but the hard influence on a loudspeaker signal leading to artifacts is avoided due to a change of position of the virtual source.

BRIEF DESCRIPTION OF THE DRAWINGS

These and other objects and features of the present invention will become clear from the following description taken in conjunction with the accompanying drawings, in which:

FIG. 4*a* is valid, and a second time, when FIG. 4*b* is valid;

DESCRIPTION OF THE PREFERRED EMBODIMENTS

Figure 1:
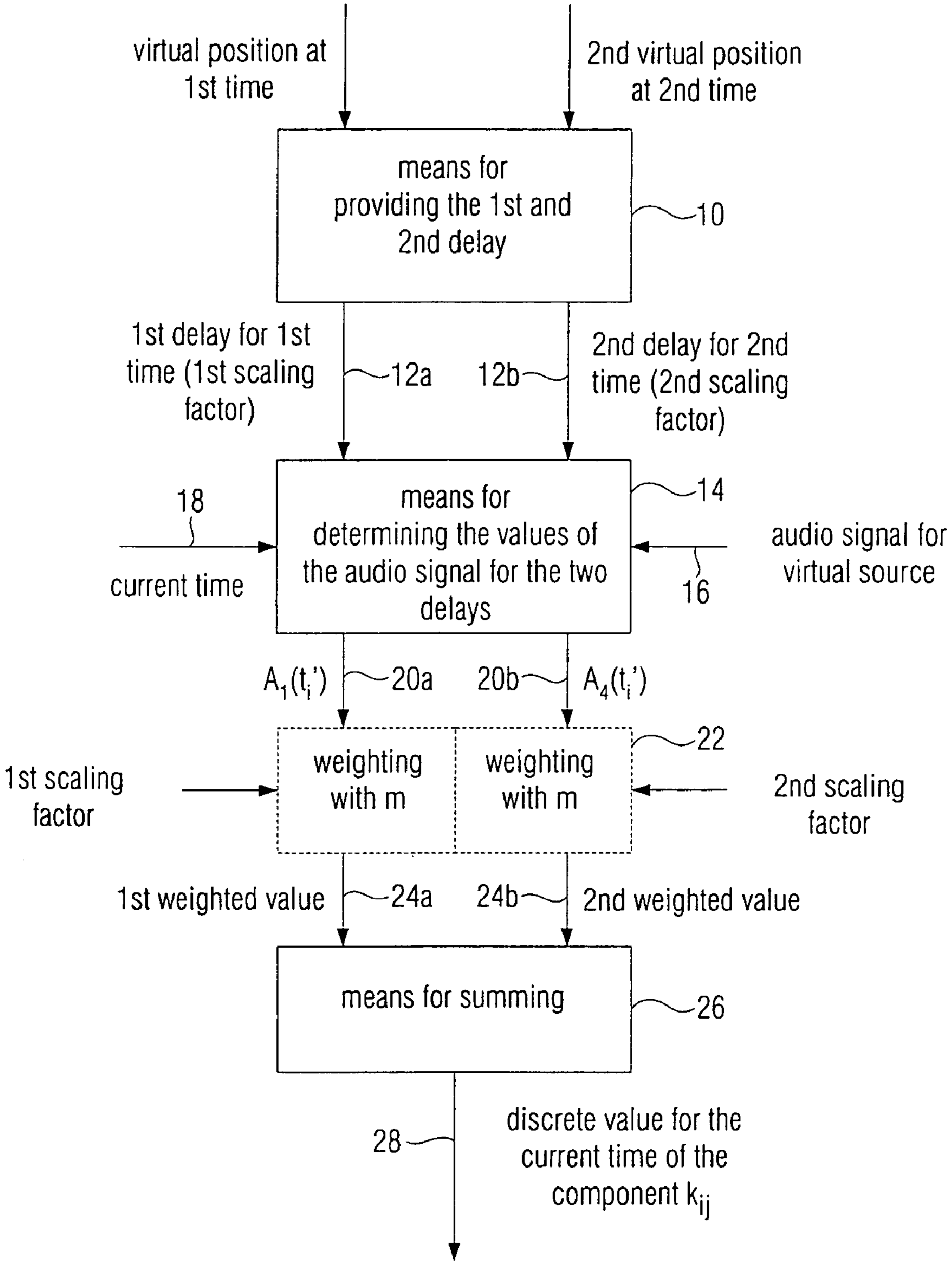
FIG. 1 is a block diagram of an inventive apparatus.

Before reference will be made in more detail to FIG. 1 for illustrating the inventive apparatus, first, a classical wave-field synthesis environment will be illustrated with regard to FIG. 2. A wave-field synthesis module 200 comprising several inputs 202, 204, 206 and 208 as well as several outputs 210, 212, 214, 216 is the center of a wave-field synthesis environment. Different audio signals for virtual sources are supplied to the wave-field synthesis module via inputs 202 to 204. Thus, input 202 receives, for example, an audio signal of the virtual source 1 as well as associated position information of the virtual source. In a cinema setting, for example, the audio signal 1 would be, for example, the speech of an actor moving from a left side of the screen to a right side of the screen and possibly additionally away from the audience or towards the audience. Then, the audio signal 1 would be the actual speech of this actor, while the position information as function of time represents the current position of the first actor in the recording setting at a certain time. In contrary, the audio signal n would be the speech, for example of a further actor which moves in the same way or in a different way than the first actor. The current position of the other actor to which the audio signal n is associated, is provided to the wave-field synthesis module 200 by position information synchronized with the audio signal n. In practice, different virtual sources exist, depending on recording setting and studio, respectively, wherein the audio signal of every virtual source is supplied as individual audio track to the wave-field synthesis module 200.

As has been explained above, one wave-field synthesis module feeds a plurality of loudspeakers LS1, LS2, LS3, LSm by outputting loudspeaker signals via the outputs 210 to 216 to the individual loudspeakers. Via the input 206, the positions of the individual loudspeakers in a reproduction setting, such as a cinema, are provided to the wave-field synthesis module 200. In the cinema, many individual loudspeakers are grouped around the audience, which are arranged in arrays preferably such that loudspeakers are both in front of the audience, which means, for example, behind the screen and behind the audience as well as on the right hand side and left hand side of the audience. Further, other inputs can be provided to the wave-field synthesis module 200, such as information about the room acoustics, etc., in order to be able to simulate actual room acoustics during the recording setting in a cinema.

Generally, the loudspeaker signal, which is, for example, supplied to the loudspeaker LS1 via the output 210, will be a superposition of component signals of the virtual sources, in that the loudspeaker signal comprises for the loudspeaker LS1 a first component coming from the virtual source 1, a second component coming from the virtual source 2 as well as an n-th component coming from the virtual source n. The individual component signals are linearly superposed, which means added after their calculation to reproduce the linear superposition at the ear of the listener who will hear a linear superposition of the sound sources he can perceive in a real setting.

Figure 3:
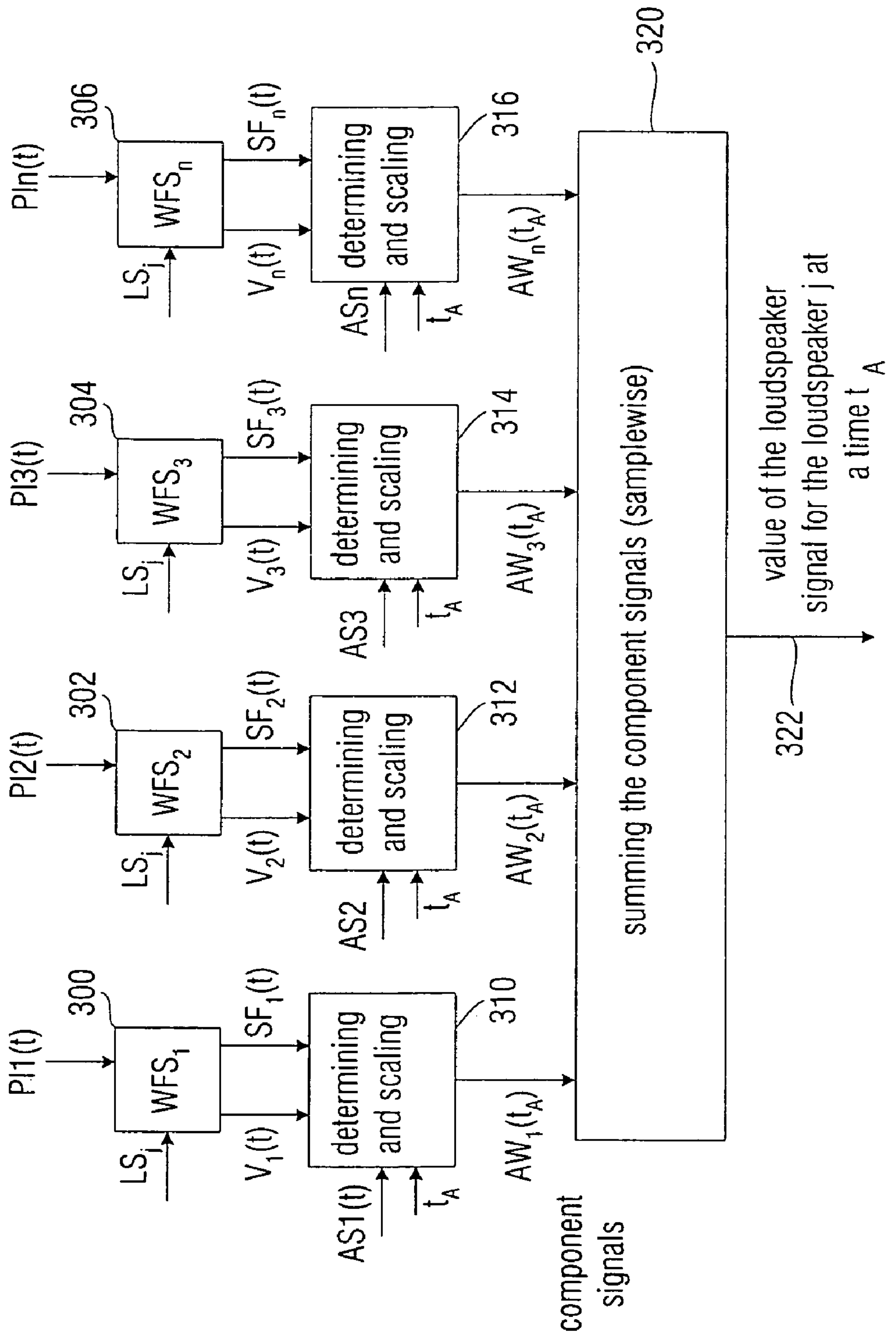
FIG. 3 is a detailed representation of the wave-field synthesis module shown in FIG. 2.

In the following, a detailed design of the wave-field synthesis module 200 will be illustrated with regard to FIG. 3. The wave-field synthesis module 200 has a very parallel structure in that starting from the audio signal for every virtual source and starting from the position information for the corresponding virtual source, first, delay information $V_i$ as well as scaling factors $SF_i$ are calculated, which depend on the position information and the position of the just considered loudspeaker, e.g. the loudspeaker with the ordinal number j, which means $LS_j$. The calculation of delay information $V_i$ as well as a scaling factor $SF_i$ based on the position information of a virtual source and the position of the considered loudspeaker j is performed by known algorithms, which are implemented in means 300, 302, 304, 306. Based on the delay information $V_i(t)$ and $SF_i(t)$ as well as based on the audio signal $AS_i(t)$ associated to the individual virtual source, a discrete value $AW_i(t_A)$ is calculated for the component signal $K_{ij}$ for a current time $t_A$ in a finally obtained loudspeaker signal. This is performed by means 310, 312, 314, 316 as illustrated schematically in FIG. 3. Further, FIG. 3 shows a “flash light recording” at a time $t_A$ for the individual component signals. The individual component signals are then summed by a summer 320 to determine the discrete value for the current time $t_A$ of the loudspeaker signal for the loudspeaker j, which can be supplied to the loudspeaker for the output (for example the output 214, if the loudspeaker j is the loudspeaker LS3).

As can be seen from FIG. 3, first, a value is calculated individually for every virtual source, which is valid at a current time due to a delay and scaling with a scaling factor, and then all component signals for one loudspeaker are summed due to the different virtual sources. If, for example, only one virtual source were present, the summer would be omitted and the signal applied at the output of the summer in FIG. 3 would, for example, correspond to the signal output by means 310 when the virtual source 1 is the only virtual source.

Figure 4A:
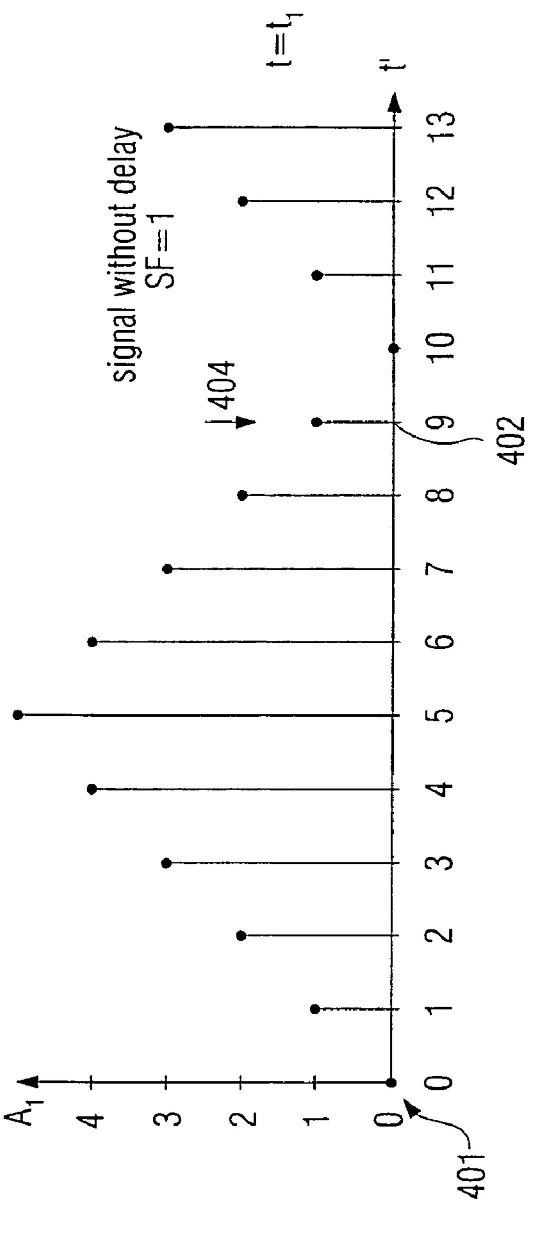
FIG. 4*a* is a waveform of a discrete audio signal of a virtual source at a first time with a first delay D=0.
Figure 8:
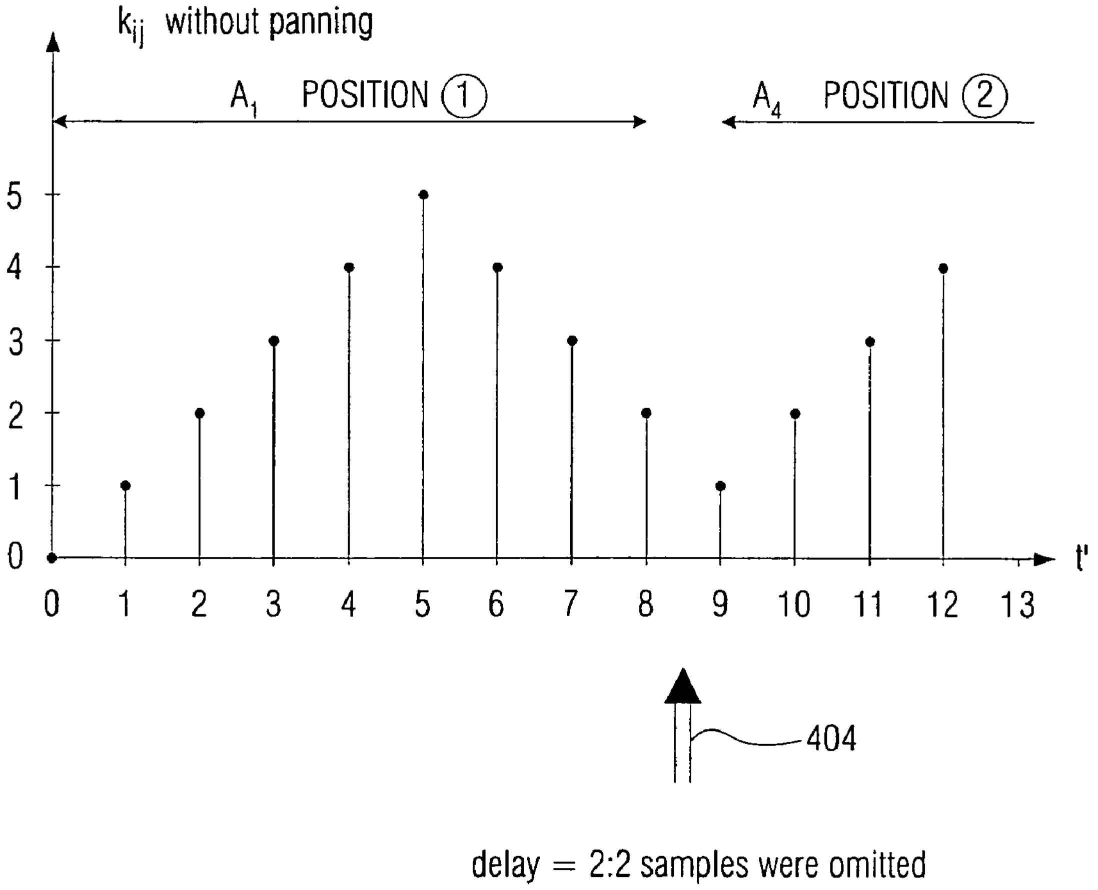
FIG. 8 is a waveform of the component $K_{ij}$ without panning.

In the following, the mode of operation of the apparatus illustrated in FIG. 3 will be discussed with reference to FIGS. 4*a*, 4*b* and 8. FIG. 4*a* shows an exemplary audio signal of the virtual source over the time t', which has discrete values extending from a time t'=0 to a time t'=13. As scaling factor at a time t'=0, a scaling factor of 1 is assumed. Further, without loss of generality, it is assumed that a delay of 0 samples has been calculated by the wave-field synthesis module at a time t'=0.

At the first time t'=0, which is further marked by 401 in FIG. 4*a*, the audio signal of a virtual source illustrated in FIG. 4*a* is to be played, while at a second time 402, which is indicated in FIG. 4*a*, switching is performed from the audio signal with a delay D=0 to the same audio signal, but now with a delay D=2. The switching time is further indicated by an arrow 404 in FIG. 4*a*.

Figure 4B:
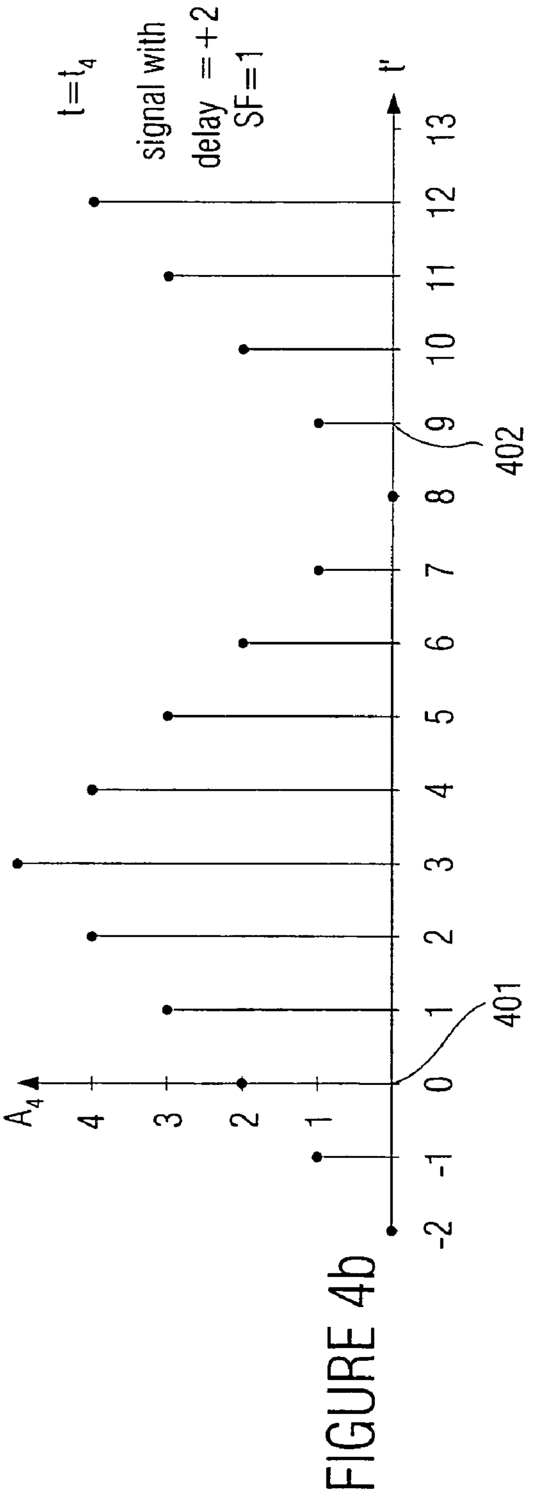
FIG. 4*b* is a representation of the same audio signal as in FIG. 4*a*, but with a delay D=2.

The audio signal shifted from the virtual source by D=2 is illustrated in FIG. 4*b* as function of time for current times of t'=−2 to t'=12. The components for the loudspeaker signal based on the virtual source illustrated in FIG. 4*a* and FIG. 4*b* consists thus of the values shown in FIG. 4*a* from a time 0 to a time 8 and of the samples at the current times 9 to 12 illustrated in FIG. 4*b* from a time 9 to a later time when a change of position is signalized again. This signal is illustrated in FIG. 8. It can be seen that at the time of switching, which means the time of switching from the one position to the other position, wherein the switching is again indicated by 404 in FIG. 8, two samples have been omitted. According to the audio signal shown in FIG. 4*a*, a sample with an amplitude of 1 would have to occur at time 9, but at a time 10 a sample with an amplitude of 0, while the signal shown in FIG. 8 already has a sample with an amplitude of 2 at a time 10, which is the case due to the delay D=2. This omitting of the two samples leads to the above-mentioned virtual Doppler effect.

Figure 2:
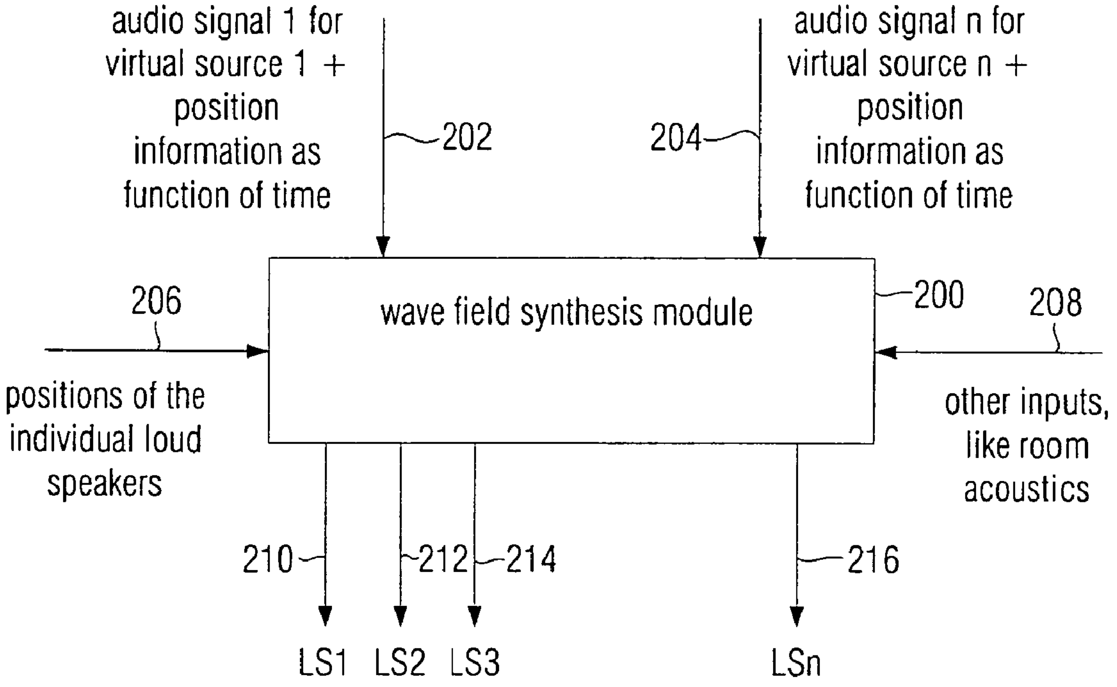
FIG. 2 is a basic diagram of a wave-field synthesis environment as it can be used for the present invention.
Figure 7:
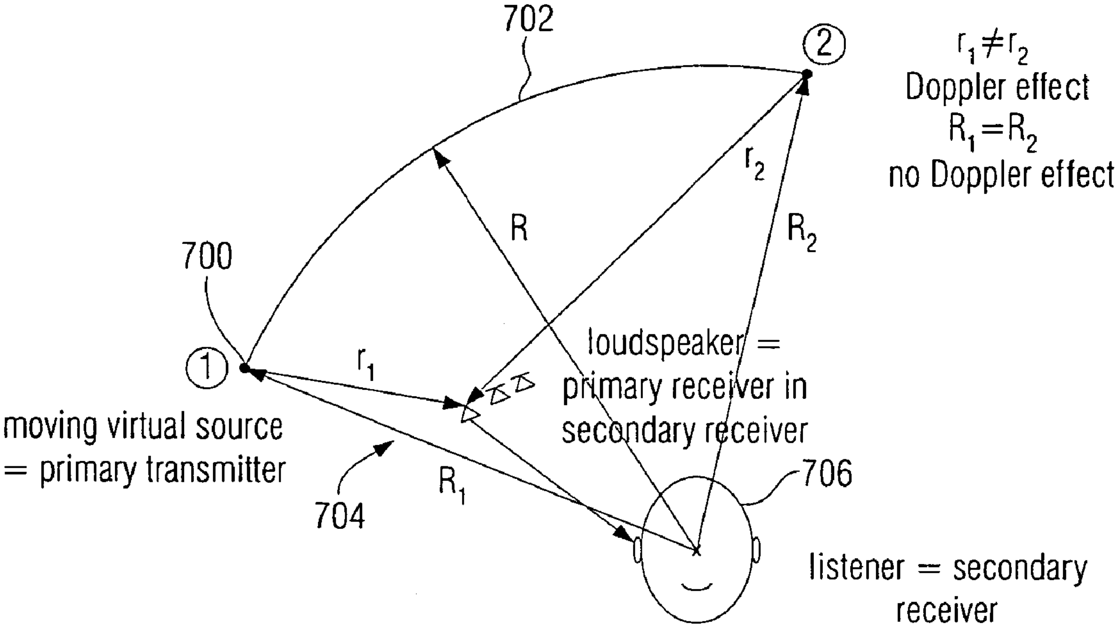
FIG. 7 is a scenario for illustrating a virtual Doppler effect.

For suppressing the undesired characteristics and for suppressing the artifacts caused by this switching from one delay to another delay, the inventive apparatus shown in FIG. 1 will be used. FIG. 1 shows an apparatus for calculating a discrete value for a current time of a component $K_{ij}$ in a loudspeaker signal for a loudspeaker j based on a virtual source i in a wave-field synthesis system with a wave-field synthesis module and a plurality of loudspeakers. Particularly, the wave-field synthesis module is formed to determine delay information by using an audio signal associated to the virtual source and by using position information indicating a position of the virtual source, indicating delayed by how many samples the audio signal is to occur with regard to a time reference in the component. The apparatus shown in FIG. 1 comprises a means 10 for providing a first delay, which is associated to a first position of the virtual source, and for providing a second delay, which is associated to a second position of the virtual source. Particularly, the first position of the virtual source relates to a first time and the second position of the virtual source relates to a second time which is later than the first time. Further, the second position differs from the first position. The second position is, for example, the position of the virtual source indicated in FIG. 7 with the encircled “2”, while the first position is the position of the virtual source 700 indicated in FIG. 7 by an encircled “1”.

Thus, the means 10 for providing provides on the output side a first delay 12*a* for the first time as well as a second delay 12*b* for the second time. Optionally, the means 10 is further formed to also output scaling factors for the two times apart from the delays, as will be discussed below.

The two delays at the outputs 12*a*, 12*b* of the means 10 are supplied to a means 14 for determining the value of the audio signal delayed by the first delay, which is supplied to means 14 via an input 16, for the current time (which can be signalized via an input 18) and for determining a second value of the audio signal delayed by the second delay for the current time. On the output side, the means 14 for determining provides first a first value $A_1(t_{i'})$ at a time $t_{i'}=t_A$ of the audio signal delayed by the first delay, indicated by 20*a* in FIG. 1, as well as a second value 20*b* at the current time $t_{i'}=t_A$ of the audio signal delayed by the second delay 12*b*, wherein $A_1$ is to be definitely valid at the first time and wherein $A_4$ is to be definitely valid at the second time.

Further, the inventive apparatus comprises a means 22 for weighting the first value of $A_1$ with a first weighting factor to obtain a weighted first value 24*a*. Further, the means 22 is effective to weight the second value 20*b* from $A_4$ with a second weighting factor n to obtain a second weighted value 24*b*. The two weighted values 24*a* and 24*b* are supplied to a means 26 for summing the two values to obtain an “panned” discrete value 28 for the current time of the component $K_{ij}$ in a loudspeaker signal for a loudspeaker j based on the virtual source i.

In the following, the functionality of the apparatus shown in FIG. 1 will be illustrated exemplarily with regard to FIGS. 4*c*, 4*d*, 5 and 6. In the scenario explained in FIGS. 4*a* and 4*b*, switching from one delay to another delay is required after 10 samples. The first time 401 is the current time $t_A$=0, while the second time 402 is the current time $t_A$=9.

According to the invention, neither the value of $A_1$ at a first time 401 nor the value of $A_4$ at a second time 402 is modified. However, all values between $t_1$ 401 and $t_2$ 402 are modified according to the invention, which means values associated to a current time $t_A$, which lies between the first time 401 and the second time 402. Thus, the current time extends from the times t'=1 to t'=8 for the subsequent exemplary explanation.

Figure 6:
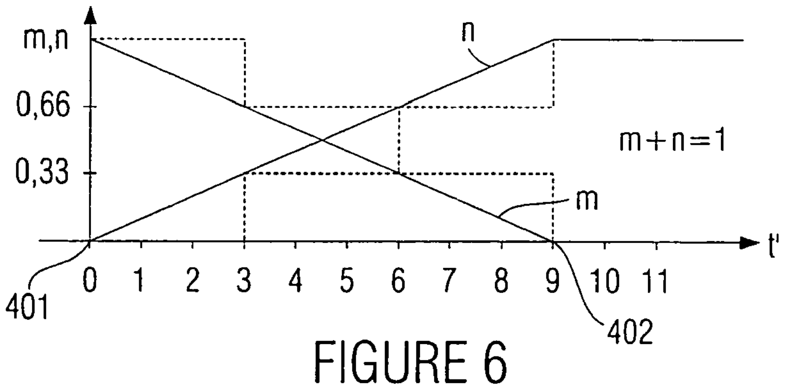
FIG. 6 is a detailed representation of the weighting factors m, n, used for the calculation of the audio signals shown in FIGS. 4*a* to 4*d;*

In mathematical terms, this is expressed in the graph in FIG. 6, which illustrates the first weighting factor m as function of the current times between the first time 401 and the second time 402. Thus, the first weighting factor m falls monotonously, while the second weighting factor n increases monotonously. At the first time 401, which means t'=0, m=1 and n=0. On the other hand, at a time 402, the first weighting factor m=0 and the second weighting factor m=1. Between the first time 401 and the second time 402, the two weighting factors will have a step like curve, since a calculation can be made only for every sample and not continuously. The step like curve will be a curve indicated in a broken and dotted way, respectively, in FIG. 6, which will follow the continuous line correspondingly often depending on the number of panning events and the predetermined computing capacity resources between the first time 401 and the second time 402, respectively.

Figure 4C:
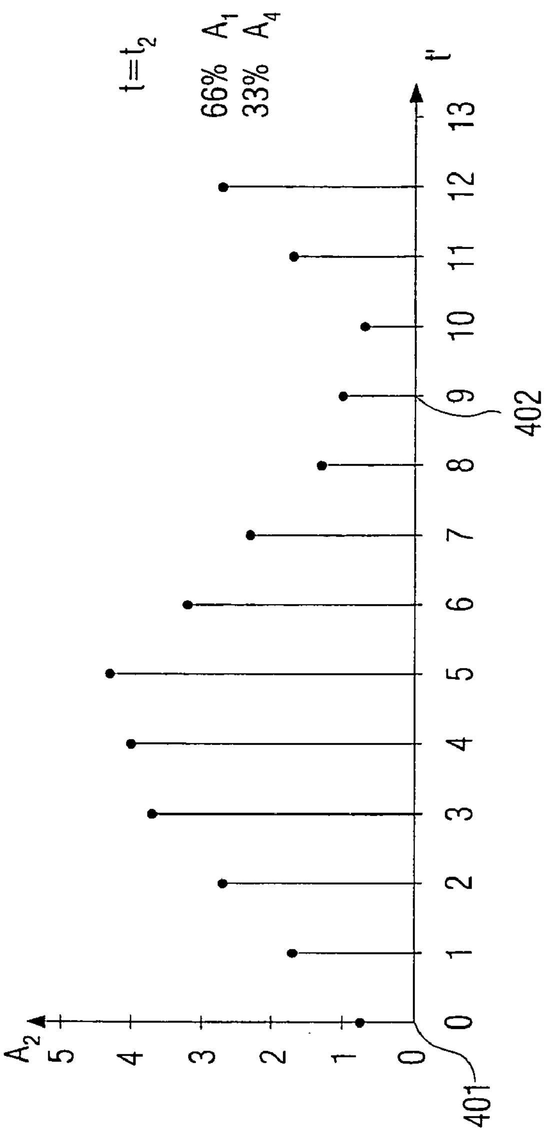
FIG. 4*c* is a first panned version based on the audio signals shown in FIGS. 4*a* and 4*b* in a time between the first time, when
Figure 4D:
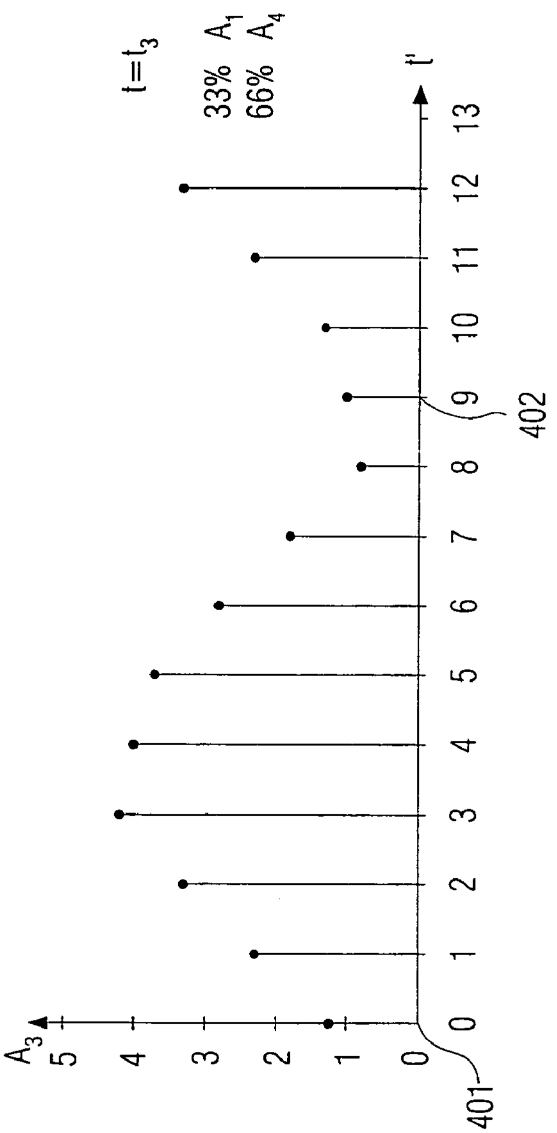
FIG. 4*d* is a further panning representation at a later time than FIG. 4*c* when the signal illustrated in FIG. 4*b* is valid.
Figure 5:
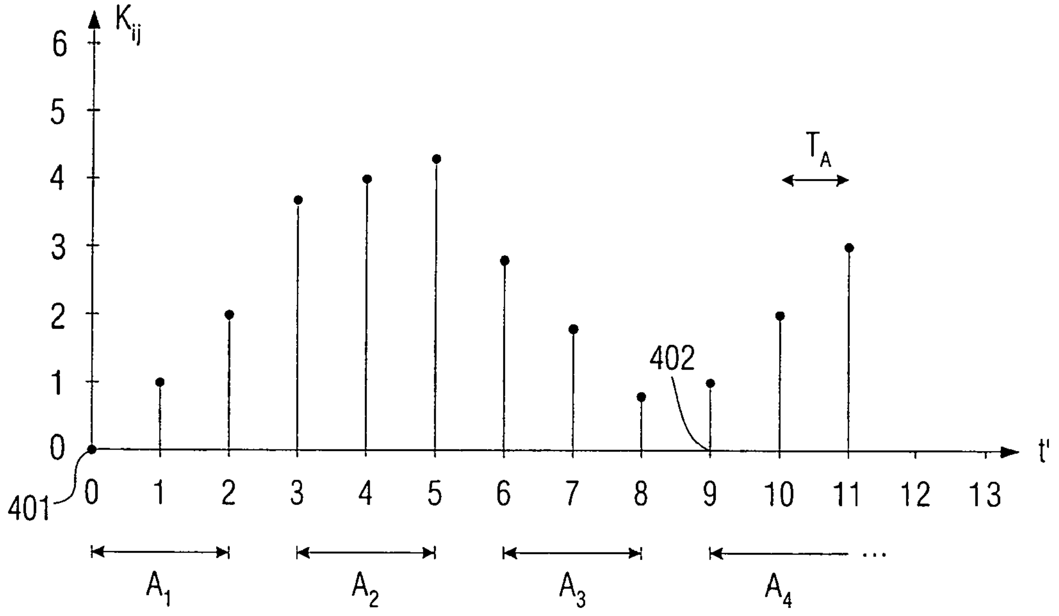
FIG. 5 is a waveform of the component $K_{ij}$ in a loudspeaker signal based on a virtual source i, which is made up of waveforms of FIGS. 4*a* to 4*d;*

Merely exemplarily, in the embodiment illustrated in FIG. 6, which is reflected in FIGS. 4*c* and 4*d*, two panning events have been used between the first time 401 and the second time 402. The first panning event takes place at the current time $t_A$=3, while the second panning event takes place at the current time $t_A$=6. The signal with the weighting factors m and n associated to the first panning time in FIG. 6, is indicated by $A_2$ in FIG. 4*c*. Further, the signal associated to the second panning time in FIG. 6 is indicated by $A_3$ in FIG. 4*d*. The actual waveform of the component $K_{ij}$, which is finally calculated (FIGS. 4*a* to 4*d* serve merely for illustration purposes), is illustrated in FIG. 5. In the embodiment shown in FIGS. 4*a* to 4*d*, FIG. 5 and FIG. 6, not for every new sample, which means with a period length $t_A$, a new weighting factor is calculated, but merely every three sample time periods. Thus, for the current times 0, 1 and 2, the samples corresponding to these times are taken from FIG. 4*a*. For the current times 3, 4 and 5, the samples of FIG. 4*c* for the times 3, 4 and 5 are taken. Further, for the times 6, 7 and 8, the samples belonging to FIG. 4*d* are taken, while finally for the times 9, 10 and 11 as well as further times up to a next change of position or to a next panning action, respectively, the sample of FIG. 4*b* are taken, which correspond to the current times 9, 10 or 11, respectively. A comparison of FIG. 5 with FIG. 8 discloses that the sharp symmetry around the sample at the current time $t_A$=9is relaxed, in that the "omitting" of two samples which lead to this artifact in FIG. 8, is correspondingly "slurred" in FIG. 5.

A "finer" slurring could be achieved when the position update interval PAI shown in FIG. 5 is not only performed every three samples as shown in FIG. 5, but at every sample, so that the parameter N in FIG. 5 would become 1. In that case, the step curve symbolizing the first weighting factor m would be correspondingly approximated closer to the continuous curve. Alternatively, the position update interval could also be made larger than 3, so that, for example, only one update is performed in the middle of the interval between the second time 402 and the first time 401, so that in the first half of the interval, which means for the current times $t_A$=1 to 4 m=1 and m=0, while for the second half of the corresponding interval, which means for the current times 5, 6, 7 and 8 m and n would be 0.5, such that then at the second time 402, which means the current time $t_A$=9, n becomes 1 and m 0. The selection whether panning is performed at every sample or whether panning, which means a position update, is only performed every N samples, can be different from case to case. It can particularly depend on how fast a virtual source moves. If it moves very slow, it is sufficient to use a relatively high parameter N, which means to perform a new position update only after a relatively high-number of samples, which means to generate a new "stage" in FIG. 6, while in the opposite case, which means when the source moves fast, a rather more frequent position update is preferred.

In the embodiment illustrated in FIGS. 4*a*-4*d* it has been assumed that first position information for the virtual source, which is considered, were present at the first time 401, while the second position information for the virtual source were present at the second time 402, which is nine samples after the first time. Depending on the implementation, it can happen that individual position information is present for every sample, and that such position information can easily be obtained for interpolation, respectively. Thus, so far, the movement of the source has been calculated in very small spatial and therewith time steps for every intermediate position, in order to avoid audible clicks in the audio signal during switching from one delay to another delay, wherein this switching can only be avoided when the samples prior and after switching did not differ too much.

However, for the inventive panning, the current time $t_A$ has to lie between the first time 401 and the second time 402. The minimum "step width", which means the minimum distance between the first time 401 and the second time 402 is two sample periods according to the invention, so that the current time between the first time 401 and the second time 402 can be processed with, for example, respective weighting factors of 0.5. For the practice however, a larger step width is preferred, on the one hand for computing time reasons and on the other hand for generating a panning effect which would not occur when the following position is already achieved at the next time, which would again lead to a natural Doppler effect in the conventional wave-field synthesis. An upper limit for the step width, which means for the distance from the first time 401 to the second time 402 will be that with increasing distance more and more position information, which would actually be provided, are ignored due to panning, which will, in the extreme case, lead to a loss of locatability of the virtual source for the listener. Thus, step widths in the medium range are preferred, which can depend additionally on the speed of the virtual source depending on the embodiment to realize an adaptive step width control. A provider for providing the first and the second delays is formed to set a time distance of the first time and the second time in dependence on position information. In this way, the time distance is higher than a reference distance when the virtual source moves with less speed than a reference speed, and that the time distance is smaller than the reference distance when the virtual source moves with higher speed than the reference speed.

In the embodiment shown in FIG. 6, a linear curve has been chosen as "base" for the step curve for the first and second weighting factor. Alternatively, a sinusoidal, square, cubic, etc. curve could be used. In that case, the corresponding curve of the other weighting factor would have to be complementary in that the sum of the first and second weighting factors is always equal 1 or lies within a predetermined tolerance range, respectively, which extends, for example, about plus or minus 10% around 1. One option would be, for example, for the first weighting factor to take a curve according to the square of the sinusoidal function, and for the second weighting factor to take a curve according to the square of the cosine function, since the squares for sine and cosine are equal to 1 for every argument, which means for every current time $t_A$.

In FIGS. 4a to 4d it has so far been assumed that the scaling factors at the first time 401 and the second time 402 are both equal 1. This does not necessarily have to be like that. Thus, every sample of the audio signal associated to a virtual source will have a certain value $B_i$. The wave-field synthesis module would then be effective to calculate a first scaling factor $SF_1$ for the first time 401 and a second scaling factor $SF_2$ for the second time 402. The actual sample at a current time $t_A$ between the first time 401 and the second time 402 would then be as follows:

$$AW_i=B(t_A)*m*SF_1+B(t_A)*n+SF_2.$$

From the above expression, for simplification reasons, the multiplication of a value of the audio signal with two weighting factors can be replaced by a multiplication of the value with the product of the two weighting factors.

Depending on the circumstances, the inventive method as illustrated with regard to FIG. 1 can be implemented in hardware or in software. The implementation can be performed on a digital memory media, particularly a disc or CD with electronically readable control signals, which can cooperate with a programmable computer system such that the method is performed. Generally, thus, the invention consists also of a computer program product with a program code stored on a machine-readable carrier for performing the inventive method when the computer program product runs on a computer. In other words, the invention can thus be realized as computer program with a program code for performing the method when the computer program runs on a computer.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. Apparatus for calculating a plurality of loudspeaker signals for a plurality of loudspeakers, the plurality of loudspeakers comprising at least four loudspeakers, the apparatus comprising:

a wave-field synthesis system with a wave-field synthesis module for calculating, for each virtual source of a plurality of virtual sources at different virtual positions, a component signal for each loudspeaker of the plurality of loudspeakers, wherein each component signal for each loudspeaker and each virtual source has a discrete value for a current time of the component signal for a loudspeaker based on the virtual source, wherein the wave-field synthesis module is formed to determine, for each virtual source and each component signal, delay information for the virtual source using position information indicating a position of the virtual source, wherein the delay information indicates by how many samples an audio signal is to occur delayed with regard to a time reference in the component signal for a loudspeaker;

a provider for providing, for each virtual source and for each component signal for each loudspeaker, a first delay associated to a first position of the virtual source, the virtual source having the first position at a first time, and for providing a second delay associated to a second position of the virtual source, the virtual source having the second position at a second later time, wherein the second position differs from the first position and wherein the current time is between the first time and the second time;

a determiner for determining, for each virtual source and for each component signal for each loudspeaker, a first value of the audio signal for the virtual source for the current time, the audio signal for the virtual source being delayed by the first delay, and for determining a second value of the audio signal for the virtual source for the current time, the audio signal for the virtual source being delayed by the second delay;

a weigher for weighting, for each virtual source and for each component signal for each loudspeaker, the first value with a first weighting factor to obtain a first weighted value, and for weighting the second value with a second weighting factor to obtain a second weighted value;

a summer for summing, for each virtual source and for each component signal for each loudspeaker, the first weighted value and the second weighted value to obtain the discrete value for the current time for a component signal for a loudspeaker for a virtual source; and an adder for adding, for each loudspeaker, all component signals for each virtual source for the loudspeaker to obtain the loudspeaker signal for the loudspeaker.

2. Apparatus according to claim 1, wherein the first weighting factor and the second weighting factor are set for values between the first and the second times such that panning takes place from the audio signal delayed by the first delay to the audio signal delayed by the second delay.

3. Apparatus according to claim 1, wherein the first weighting factor decreases between the first time and the second time, and wherein the second weighting factor increases between the first time and the second time.

4. Apparatus according to claim 1, wherein the first weighting factor is equal to 1 at the first time and equal to 0 at the second time, and wherein the second weighting factor is equal to 0 at the first time and is equal to 1 at the second time.

5. Apparatus according to claim 1, wherein the first and second weighting factors depend on a difference between the current time and the first time or the second time.

6. Apparatus according to claim 1, wherein the first weighting factor decreases monotonously from the first time to the second time, and the second weighting factor increases monotonously from the first time to the second time.

7. Apparatus according to claim 1, wherein a sum of the first weighting factor and the second weighting factor lies within a predetermined tolerance range extending around a defined value.

8. Apparatus according to claim 7, wherein the predetermined tolerance range is plus or minus 10%.

9. Apparatus according to claim 1, wherein the audio signal is a sequence of discrete values, which are spaced apart by one sample period, wherein the first time and the second time are spaced apart by more than one sample period.

10. Apparatus according to claim 9, wherein the first time and the second time are fixed.

11. Apparatus according to claim 9, wherein the provider for providing the first and the second delay is formed to set a time distance of the first time and the second time in dependence on position information, so that the time distance is higher than a reference distance when the virtual source moves with less speed than a reference speed, and that the time distance is smaller than the reference distance when the virtual source moves with higher speed than the reference speed.

12. Apparatus according to claim 1, wherein a time distance between the first time and the second time is N sample periods, and wherein the weigher is formed to use the same first weighting factor and the same second weighting factor for a number of M subsequent current discrete values, wherein M is smaller than N and higher than or equal to 2.

13. Apparatus according to claim 1, wherein the weigher is formed to calculate a current first weighting factor and a current second weighting factor for every current sample, so that the first and second weighting factors for every current sample are different than the first and second weighting factors that have been determined for a determined previous sample.

14. Apparatus according to claim 1, wherein the provider is formed to estimate the second delay for the second time based on one or several delays for previous times.

15. Apparatus according to claim 1, wherein several audio signals are present for several virtual sources, wherein a component is calculated for every virtual source, and wherein all components are added for a loudspeaker to obtain the loudspeaker signal for the loudspeaker.

16. Apparatus according to claim 1, wherein the wave-field synthesis module is formed to calculate scaling information apart from the delay information, which indicates by which scaling factor the audio signal associated to the virtual source is to be scaled, and wherein the weigher is formed to calculate the first weighted value as product of the value for the current time of the component and a first scaling factor for the current time and the first weighting factor, and wherein the weigher is further formed to calculate the second weighted value as product of the value of the component for the current time, of the second scaling factor for the second time and the second weighting factor.

17. Method for calculating a plurality of loudspeaker signals for a plurality of loudspeakers, the plurality of loudspeakers comprising at least four loudspeakers, the method comprising:

wave-field synthesis calculating, for each virtual source of a plurality of virtual sources at different virtual positions, a component signal for each loudspeaker of the plurality of loudspeakers, wherein each component signal for each loudspeaker and each virtual source has a discrete value for a current time of the component signal for a loudspeaker based on the virtual source, determining, for each virtual source and each component signal, delay information for the virtual source using position information indicating a position of the virtual source, wherein the delay information indicating by how many samples an audio signal is to occur delayed with regard to a time reference in the component signal for a loudspeaker;

providing, for each virtual source and for each component signal for each loudspeaker, a first delay associated to a first position of the virtual source, the virtual source having the first position at a first time;

providing a second delay associated to a second position of the virtual source, the virtual source having the second position at a second later time, wherein the second position differs from the first position and wherein the current time is between the first time and the second time;

determining, for each virtual source and for each component signal for each loudspeaker, a first value of the audio signal for the virtual source for the current time, the audio signal for the virtual source being delayed by the first delay;

determining, for each virtual source and for each component signal for each loudspeaker, a second value of the audio signal for the virtual source for the current time, the audio signal for the virtual source being delayed by the second delay;

weighting, for each virtual source and for each component signal for each loudspeaker, the first value with a first weighting factor to obtain a first weighted value;

weighting, for each virtual source and for each component signal for each loudspeaker, the second value with a second weighting factor to obtain a second weighted value;

summing, for each virtual source and for each component signal for each loudspeaker, the first weighted value and the second weighted value to obtain the discrete value for the current time for a component signal for a loudspeaker for a virtual source; and adding, for each loudspeaker, all component signals for each virtual source for the loudspeaker to obtain the loudspeaker signal for the loudspeaker.

18. Digital memory media having stored thereon a computer program with a program code for performing, when running on a computer, a method for calculating a plurality of loudspeaker signals for a plurality of loudspeakers, the plurality of loudspeakers comprising at least four loudspeakers, the computer program comprising:

program code for wave-field synthesis calculating, for each virtual source of a plurality of virtual sources at different virtual positions, a component signal for each loudspeaker of the plurality of loudspeakers, wherein each component signal for each loudspeaker and each virtual source has a discrete value for a current time of the component signal for a loudspeaker based on the virtual source, program code for determining, for each virtual source and each component signal, delay information for the virtual source using position information indicating a position of the virtual source, wherein the delay information indicates by how many samples an audio signal is to occur delayed with regard to a time reference in the component signal for a loudspeaker;

program code for providing, for each virtual source and for each component signal for each loudspeaker, a first delay associated to a first position of the virtual source, the virtual source having the first position at a first time;

program code for providing a second delay associated to a second position of the virtual source, the virtual source having the second position at a second later time, wherein the second position differs from the first position and wherein the current time is between the first time and the second time;

program code for determining, for each virtual source and for each component signal for each loudspeaker, a first value of the audio signal for the virtual source for the current time, the audio signal for the virtual source being delayed by the first delay;

program code for determining, for each virtual source and for each component signal for each loudspeaker, a second value of the audio signal for the virtual source for the current time, the audio signal for the virtual source being delayed by the second delay;

program code for weighting, for each virtual source and for each component signal for each loudspeaker, the first value with a first weighting factor to obtain a first weighted value;

program code for weighting, for each virtual source and for each component signal for each loudspeaker, the second value with a second weighting factor to obtain a second weighted value;

program code for summing, for each virtual source and for each component signal for each loudspeaker, the first weighted value and the second weighted value to obtain the discrete value for the current time for a component signal for a loudspeaker for a virtual source; and program code for adding, for each loudspeaker, all component signals for each virtual source for the loudspeaker to obtain the loudspeaker signal for the loudspeaker.

19. Method of calculating a discrete value for a current time of a component in a loudspeaker signal for a loudspeaker based on a virtual source in a wave-field synthesis system with a wave-field synthesis module and a plurality of loudspeakers, wherein the wave-field synthesis module is formed to determine delay information by using an audio signal associated to the virtual source and by using position information indicating a position of the virtual source, indicating by how many samples the audio signal is to occur delayed with regard to a time reference in the component, wherein the audio signal is a sequence of discrete values, which are spaced apart by a sample period, comprising:

providing a first delay associated to a first position of the virtual source, the virtual source having the first position at a first time;

providing a second delay associated to a second position of the virtual source, the virtual source having the second position at a second later time, wherein the second position differs from the first position, wherein the current time is between the first time and the second time, and wherein the first time and the second time are spaced apart by more than the sample period;

wherein in the steps of providing the first delay and the second delay a time distance of the first time and the second time is set in dependence on position information, so that the time distance is higher than a reference distance when the virtual source moves with less speed than a reference speed, and that the time distance is smaller than the reference distance when the virtual source moves with higher speed than the reference speed, determining a first value of the audio signal for the current time, the audio signal being delayed by the first delay;

determining a second value of the audio signal for the current time, the audio signal being delayed by the second delay;

weighting the first value with a first weighting factor to obtain a first weighted value, weighting the second value with a second weighting factor to obtain a second weighted value; and summing the first weighted value and the second weighted value to obtain the discrete value for the current time.

20. Method of calculating a discrete value for a current time of a component in a loudspeaker signal for a loudspeaker based on a virtual source in a wave-field synthesis system with a wave-field synthesis module and a plurality of loudspeakers, wherein the wave-field synthesis module is formed to determine delay information by using an audio signal associated to the virtual source and by using position information indicating a position of the virtual source, indicating by how many samples the audio signal is to occur delayed with regard to a time reference in the component, comprising:

providing a first delay associated to a first position of the virtual source, the virtual source having the first position at a first time;

providing a second delay associated to a second position of the virtual source, the virtual source having the second position at a second later time, wherein the second position differs from the first position and wherein the current time is between the first time and the second time, wherein a time distance between the first time and the second time is N sample periods;

determining a first value of the audio signal for the current time, the audio signal being delayed by the first delay;

determining a second value of the audio signal for the current time, the audio signal being delayed by the second delay;

weighting the first value with a first weighting factor to obtain a first weighted value, weighting the second value with a second weighting factor to obtain a second weighted value;

wherein in the steps of weighting the same first weighting factor and the same second weighting factor for a number of M subsequent current discrete values is used, wherein M is smaller than N and higher than or equal to 2, and summing the first weighted value and the second weighted value to obtain the discrete value for the current time.

21. Method of calculating a discrete value for a current time of a component in a loudspeaker signal for a loudspeaker based on a virtual source in a wave-field synthesis system with a wave-field synthesis module and a plurality of loudspeakers, wherein the wave-field synthesis module is formed to determine delay information by using an audio signal associated to the virtual source and by using position information indicating a position of the virtual source, indicating by how many samples the audio signal is to occur delayed with regard to a time reference in the component, comprising:

providing a first delay associated to a first position of the virtual source, the virtual source having the first position at a first time, wherein the second delay for the second time is estimated based on one or several delays for previous times;

providing a second delay associated to a second position of the virtual source, the virtual source having the second position at a second later time, wherein the second position differs from the first position and wherein the current time is between the first time and the second time;

determining a first value of the audio signal for the current time, the audio signal being delayed by the first delay;

determining a second value of the audio signal for the current time, the audio signal being delayed by the second delay;

weighting the first value with a first weighting factor to obtain a first weighted value;

weighting the second value with a second weighting factor to obtain a second weighted value; and summing the first weighted value and the second weighted value to obtain the discrete value for the current time.

22. Method of calculating a discrete value for a current time of a component in a loudspeaker signal for a loudspeaker based on a virtual source in a wave-field synthesis system with a wave-field synthesis module and a plurality of loudspeakers, wherein the wave-field synthesis module is formed to determine delay information by using an audio signal associated to the virtual source and by using position information indicating a position of the virtual source, indicating by how many samples the audio signal is to occur delayed with regard to a time reference in the component, wherein the wave-field synthesis module is formed to calculate scaling information apart from the delay information, which indicates by which scaling factor the audio signal associated to the virtual source is to be scaled, comprising:

providing a first delay associated to a first position of the virtual source, the virtual source having the first position at a first time, providing a second delay associated to a second position of the virtual source, the virtual source having the second position at a second later time, wherein the second position differs from the first position and wherein the current time is between the first time and the second time;

determining a first value of the audio signal for the current time, the audio signal being delayed by the first delay;

determining a second value of the audio signal for the current time, the audio signal being delayed by the second delay;

weighting the first value with a first weighting factor to obtain a first weighted value, the first weighted value being calculated as a product of the value of the component for the current time and a first scaling factor for the current time and the first weighting factor;

weighting the second value with a second weighting factor to obtain a second weighted value, the second weighted value being calculated as a product of the value of the component for the current time, of a second scaling factor for the second time and the second weighting factor; and summing the first weighted value and the second weighted value to obtain the discrete value for the current time.

* * * * *